(12) United States Patent
Iida

(10) Patent No.: US 9,081,530 B2
(45) Date of Patent: Jul. 14, 2015

(54) CONTROL SYSTEM FOR FORMING AND OUTPUTTING IMAGE, CONTROL APPARATUS FOR FORMING AND OUTPUTTING IMAGE, AND RECORDING MEDIUM STORING A CONTROL PROGRAM FOR FORMING AND OUTPUTTING IMAGE

(71) Applicant: Hirokazu Iida, Tokyo (JP)

(72) Inventor: Hirokazu Iida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/168,040

(22) Filed: Jan. 30, 2014

(65) Prior Publication Data
US 2014/0233057 A1  Aug. 21, 2014

(30) Foreign Application Priority Data

Feb. 20, 2013 (JP) ................ 2013-031245

(51) Int. Cl.
*G06F 3/12* (2006.01)
*G06K 15/00* (2006.01)
*H04N 1/60* (2006.01)

(52) U.S. Cl.
CPC ............ *G06F 3/1245* (2013.01); *G06F 3/1203* (2013.01); *G06F 3/1277* (2013.01)

(58) Field of Classification Search
None
See application file for complete search history.

(56) References Cited

U.S. PATENT DOCUMENTS

| 2009/0015864 | A1* | 1/2009 | Hasegawa | 358/1.15 |
| 2010/0309500 | A1 | 12/2010 | Suzuki | |
| 2013/0057891 | A1* | 3/2013 | Aoki | 358/1.13 |

FOREIGN PATENT DOCUMENTS

JP  2010-286873  12/2010

* cited by examiner

*Primary Examiner* — Thomas Lett
(74) *Attorney, Agent, or Firm* — Harness, Dickey & Pierce, P.L.C.

(57) ABSTRACT

A control system for forming and outputting an image, in which an image output control apparatus cooperates with another information processing apparatus that instructs an image forming apparatus to form and output an image. The control system includes an intermediate data generator that acquires an image to be output and generates intermediate data as print data, an intermediate data storage processor that stores the generated intermediate data in a predetermined storage area, an intermediate data acquisition unit that acquires the intermediate data, an additional processor that executes an additional process in outputting the image based on the acquired intermediate data, and a print job generation controller that instructs a print job generator that generates a print job to instruct the image forming apparatus to execute forming and outputting the image to generate the print job based on the intermediate data.

11 Claims, 10 Drawing Sheets

CONTROL SYSTEM FOR FORMING AND OUTPUTTING IMAGE, CONTROL APPARATUS FOR FORMING AND OUTPUTTING IMAGE, AND RECORDING MEDIUM STORING A CONTROL PROGRAM FOR FORMING AND OUTPUTTING IMAGE

CROSS-REFERENCE TO RELATED APPLICATION

This patent application is based on and claims priority pursuant to 35 U.S.C. §119 to Japanese Patent Application No. 2013-031245, filed on Feb. 20, 2013 in the Japan Patent Office, the entire disclosure of which is hereby incorporated by reference herein.

BACKGROUND

1. Technical Field

The present invention relates to a control system for forming and outputting an image, control apparatus for forming and outputting an image, and recording medium storing a control program for forming and outputting an image.

2. Background Art

With the increasing digitization of information, image processing apparatuses such as printers and facsimiles used for outputting the computerized information and scanners used for computerizing documents have become indispensable. In most cases, these image processing apparatuses are configured as multifunctional peripherals (MFPs) that can be used as printers, facsimiles, scanners, or copiers by implementing an image pickup function, image forming function, and communication function, etc.

Among the printers used for outputting computerized documents, printers that execute printing based on print jobs generated by information processing apparatuses such as personal computers (PCs) are generally used. In addition, usually printer drivers are installed that are compatible with functions of each printer as software programs that implement functions for generating print jobs input to the printers on the information processing apparatuses.

By contrast, in some cases, some of the functions of the printer driver described above are implemented on servers instead of implementing all the functions of the printer driver on the PCs. For example, in a so-called Point&Print system, information that consists of a printer driver installed in the server is copied onto the PC, and outputting images by the image forming apparatus that the printer driver targets can be implemented by sharing the functions between the PC and the server.

In order to transfer a print job dynamically, a printer driver that includes a first function that generates a higher image format such as XML Parser Specification (XPS) and a second function that transfers the generated data in the higher image format to the printer is known (e.g., JP-2010-286873-A).

SUMMARY

An example embodiment of the present invention provides a control system for forming and outputting an image in which an image output control apparatus on which a program to use an image forming apparatus from an information processing apparatus is installed cooperates with another information processing apparatus on which a program to use the image forming apparatus is installed and instructs the image forming apparatus to form and output the image. The control system includes an intermediate data generator that acquires an image to be output and generates intermediate data as print data in format supported by multiple software modules, an intermediate data storage processor that stores the generated intermediate data in a predetermined storage area by a spooling process of the print data, an intermediate data acquisition unit that acquires the intermediate data via the software module that stores the intermediate data in the spooling process of the print data, an additional processor that executes an additional process in outputting the image based on the acquired intermediate data, and a print job generation controller that instructs a print job generator that generates a print job to instruct the image forming apparatus to execute forming and outputting the image to generate the print job based on the intermediate data.

An example embodiment of the present invention includes a control apparatus, and a non-transitory recording medium storing a program that causes a computer to implement a system controlling method.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

DETAILED DESCRIPTION

Figure 1:
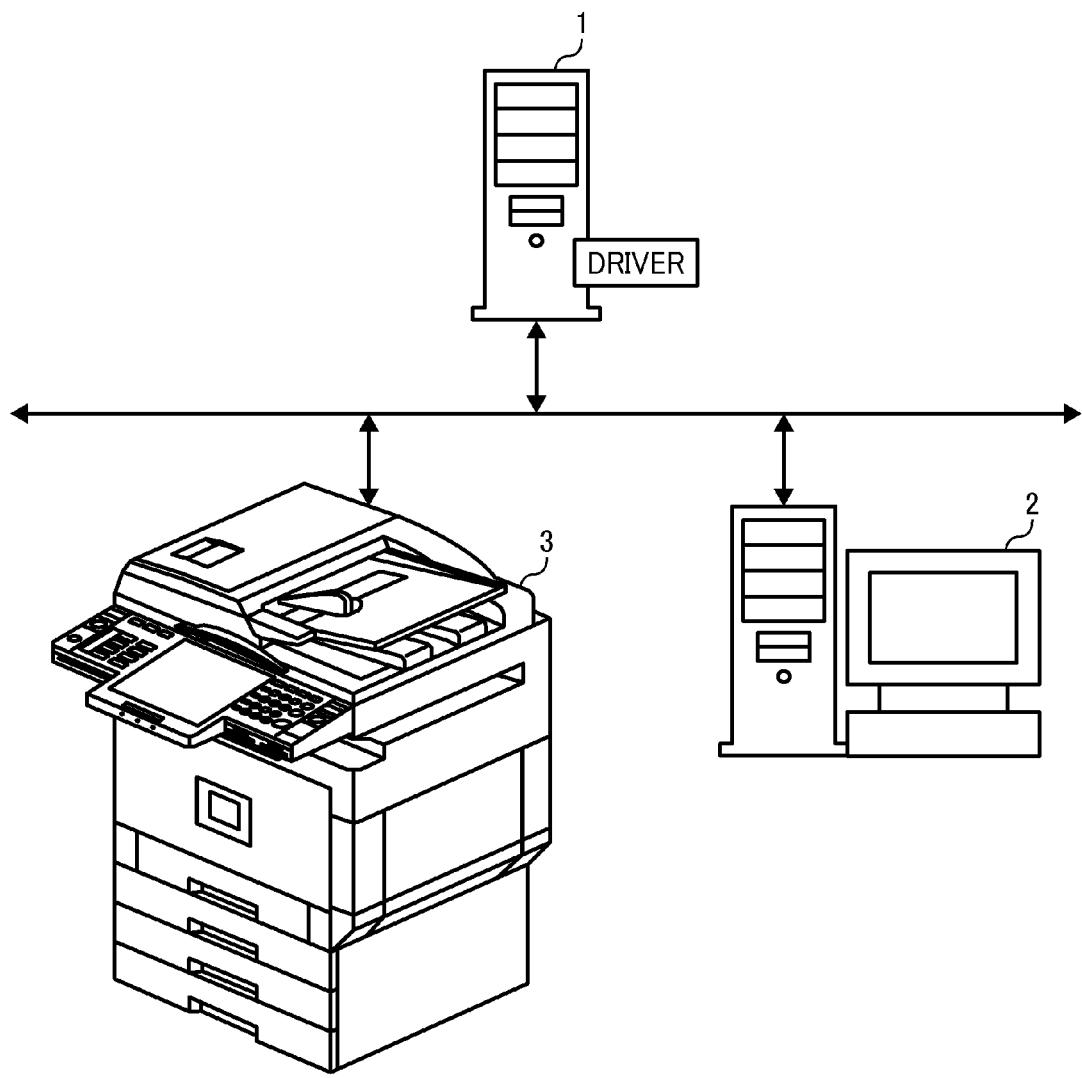
FIG. 1 is a diagram illustrating a system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Regarding functions for printing out by a printer driver, various functions are provided in addition to transferring a print job to a printer. For example, a function for displaying a preview in the state of being converted to information for printing by a printer driver and an additional function to edit the displayed preview information have been proposed.

These example functions are limited to a Page Description Language (PDL) that the printer driver supports. Consequently, in order to support similar functions in different PDLs, it is necessary to design and create printer drivers for each PDL.

To cope with this issue, a technology of tandem process that uses generic data in higher image format such as XPS as intermediate data has been proposed (e.g., JP-2010-286873-A). In that case, the intermediate data is generated in the first process, and the additional functions are implemented in the second process. In particular, an application that includes the preview function based on the generated intermediate data and the data edit function is created as a module that executes the second process described above. Consequently, since the module that executes the second process is created to support generic data, it is possible to implement additional functions such as the preview function and the data edit function universally.

Here, in order to implement the preview function and the data edit function etc. described above, the application for that purpose (hereinafter referred to as "additional processing application") needs to acquire the generated intermediate data. However, in case of distributing the print out process between the information processing apparatus and the server as the Point&Print system described above, the additional process application needs to recognize a storing destination of the intermediate data somehow, and that makes the creation of the application more complicated.

In addition, in case of constructing the additional processing application for the preview function in the image processing apparatus and storing the intermediate data in the server, the additional processing application needs to perform network access to acquire the intermediate data. In that case, it is necessary to construct the software considering protocols for the network access. In addition, it can be necessary to consider limiting access to a network to which the information processing apparatus and the server are connected.

In the following embodiment, to solve the issue described above, a system that implements a first process of generating universal data and a second process of implementing an additional function based on the generated universal data in case a part of a function for using an image processing apparatus via an information processing apparatus is distributed to another apparatus connected via a network is provided.

In the following embodiment, an image output controlling system that copies a printer driver installed on a server to a PC and distributes functions of the printer driver regarding forming and outputting an image between the server and the PC is described. This mechanism is known as Point&Print for example.

FIG. 1 is a diagram illustrating an image output controlling system in this embodiment. As shown in FIG. 1, in the image output controlling system, a driver server 1, a PC 2, and an image processing apparatus 3 are connected with each other via a network such as a Local Area Network (LAN).

In the driver server 1 as an information processing apparatus, printer drivers as software program to use various image processing apparatuses such as the image processing apparatus 3 are installed for each of image processing apparatuses to be used. By copying information that consists of the printer driver installed in the driver server 1 to the PC 2, the printer driver is installed on the PC 2, and that makes it possible to output an image cooperating with the driver server 1. That is, the driver server 1 functions as an image output control apparatus.

The PC 2 is a general information processing apparatus, and the printer driver as software program to use the image processing apparatus 3 is installed on the PC 2 by acquiring a file of the printer driver installed on the driver server 1 and storing the file. In addition, the PC 2 does not executes all functions of the printer driver installed in the driver server 1 but distributes functions of the printer driver between the PC 2 and the driver server 1, and the PC 2 executes a part of the functions of the printer driver.

The image processing apparatus 3 is a MFP that can be used as a printer, facsimile, scanner, and copier by implementing an image pickup function, image forming function, and communication function etc.

Figure 2:
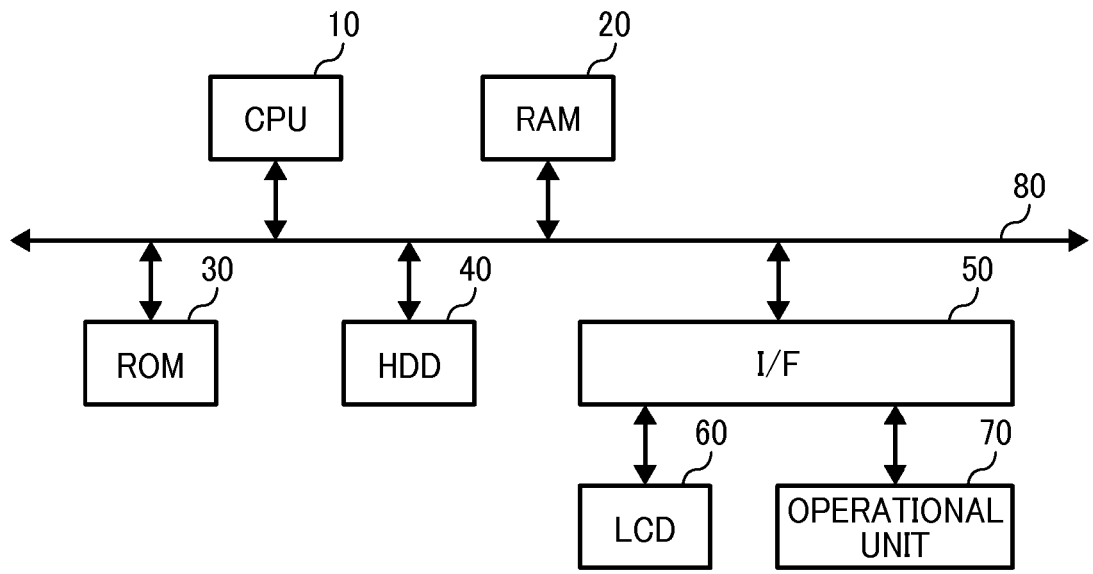
FIG. 2 is a block diagram illustrating a hardware configuration of an information processing apparatus as an embodiment of the present invention.

Next, hardware configurations of the driver server 1, the PC 2, and the image processing apparatus 3 included in the system of this embodiment is described below. FIG. 2 is a block diagram illustrating a hardware configuration of the PC 2, and the driver server 1 and the image processing apparatus 3 have a similar configuration too. As shown in FIG. 2, the PC 2 in this embodiment includes a general configuration as the image processing apparatus.

That is, in the PC 2 in this embodiment, a Central Processing Unit (CPU) 10, a Random Access Memory (RAM) 20, a Read Only Memory (ROM) 30, a hard disk drive (HDD) 40, and an interface (I/F) 50 are connected with each other via a bus 80. A Liquid Crystal Display (LCD) 60 and an operational unit 70 are connected to the I/F 50. In addition, the image processing apparatus 3 includes an engine that executes forming and outputting an image and scanning.

The CPU 10 is a processor and controls the whole operation of the PC 2. The RAM 20 is a volatile storage device that can read/write information at high speed and is used as a work area when the CPU 10 processes information. The ROM 30 is a read-only nonvolatile storage device and stores programs such as firmware. The HDD 40 is a non-volatile storage device that can read/write information and stores the OS, various control programs, and application programs etc.

The I/F 50 connects the bus 80 with various hardware and network etc. and controls them. The LCD 60 is a visual user interface to check status of the PC 2. The operational unit 70 is a user interface such as a keyboard, mouse, various hardware buttons, and touch panel to input information to the PC 2. Since the driver server 1 is used as the server, the driver server 1 can omit the user interfaces such as the LCD 60 and the operational unit 70.

In this hardware configuration described above, programs stored in storage devices such as the ROM 30, HDD 40, and optical discs (not shown in figures) are read to the RAM 20, and a software controlling unit is constructed by executing operation in accordance with the programs by the CPU 10. Functional blocks that implement functions of apparatuses that consist of the system in this embodiment are constructed by a combination of the software controlling unit described above and hardware.

Figure 3:
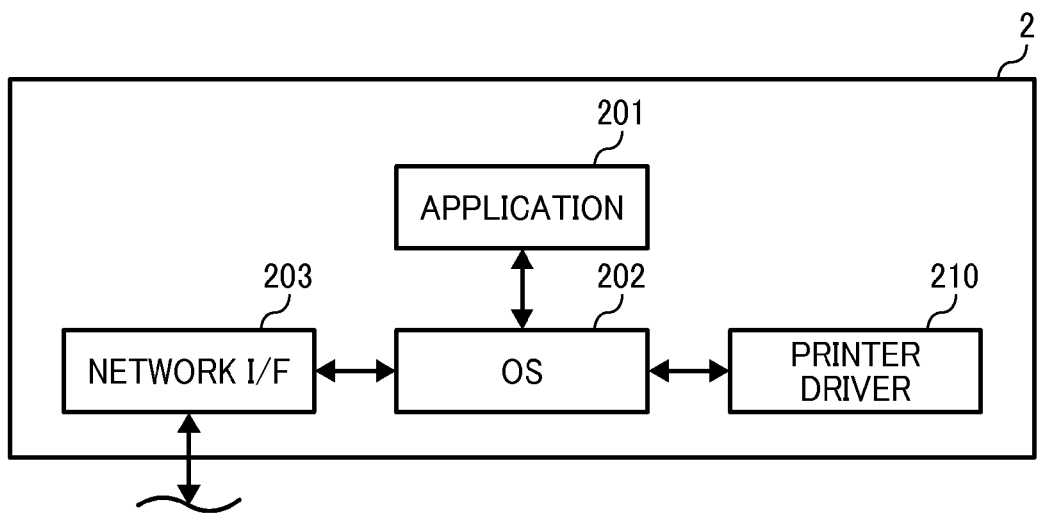
FIG. 3 is a block diagram illustrating a functional configuration of a PC as an embodiment of the present invention.

Next, in the PC 2, a function for forming and outputting an image is described below. FIG. 3 is a block diagram illustrating a functional configuration of the PC 2 regarding the function for forming and outputting an image. As shown in FIG. 3, the PC 2 in this embodiment includes an application 201, an OS 202, a network I/F 203, and a printer driver 210.

The application 201 is a software module constructed by installing corresponding software program on the PC 2 and general application software such as a word processor application, a spread sheet, and an image editing software. The application 201 executes a Graphical User Interface (GUI) of the printer driver 210 in response to user operation, acquires print settings configured via the GUI, and outputs it along with information on an image to be output.

The OS 202 controls the whole part of the PC 2. In addition, the OS 202 includes a control function with which the PC 2 instructs the image processing apparatus 3 to execute forming and outputting an image and a copy function to copy the printer driver from the server 1 to the PC 2. The network I/F 203 is an interface with which the PC 2 communicates with other apparatuses via the network.

The printer driver 210 is a software module with which the PC 2 utilizes the image processing apparatus 3 and is constructed by installing corresponding software program on the PC 2. In a restricted meaning, "printer driver" means a software module that generates a print job to instruct the image processing apparatus 3 to perform printing. However, the printer driver 210 is a group of various software modules with which the PC 2 utilizes the image processing apparatus 3. Functions included in the printer driver 210 will be described in detail later.

Figure 4:
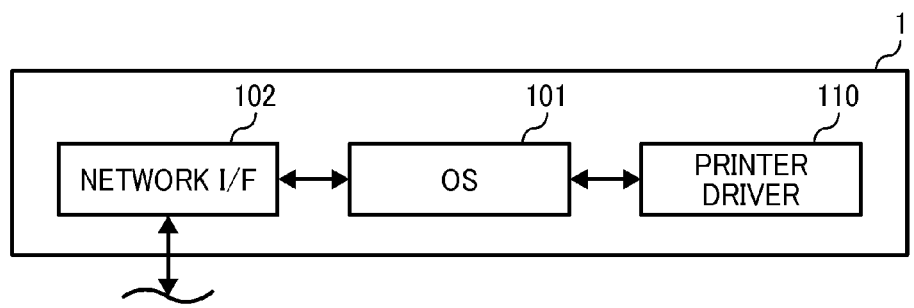
FIG. 4 is a block diagram illustrating a functional configuration of a driver server as an embodiment of the present invention.

Next, a functional configuration of the driver server 1 in this embodiment is described with reference to FIG. 4. FIG. 4 is a block diagram illustrating a functional configuration of the driver server 1. As shown in FIG. 4, the driver server 1 in this embodiment includes an OS 101, a network I/F 102, and a printer driver 110.

The OS 101 controls the whole part of the driver server 1. In addition, just like the OS 202 in the PC 2, the OS 101 includes a control function with which the driver server 1 instructs the image processing apparatus 3 to execute forming and outputting an image and a copy function to copy the printer driver from the driver server 1 to the PC 2. Just like the network I/F 203, the network I/F 102 is an interface with which the driver server 1 communicates with other apparatuses via the network.

The printer driver 110 is a group of software modules to utilize the image processing apparatus 3 just like the printer driver 210 in the PC 2. However, the driver server 1 does not execute forming and outputting an image solely by using the image processing apparatus 3 fundamentally. Basically, the driver server 1 instructs the image processing apparatus 3 to operate in cooperation with the PC 2. In addition, the printer driver 110 is a copy source when the printer driver is copied from the driver server 1 to the PC 2.

Figure 5:
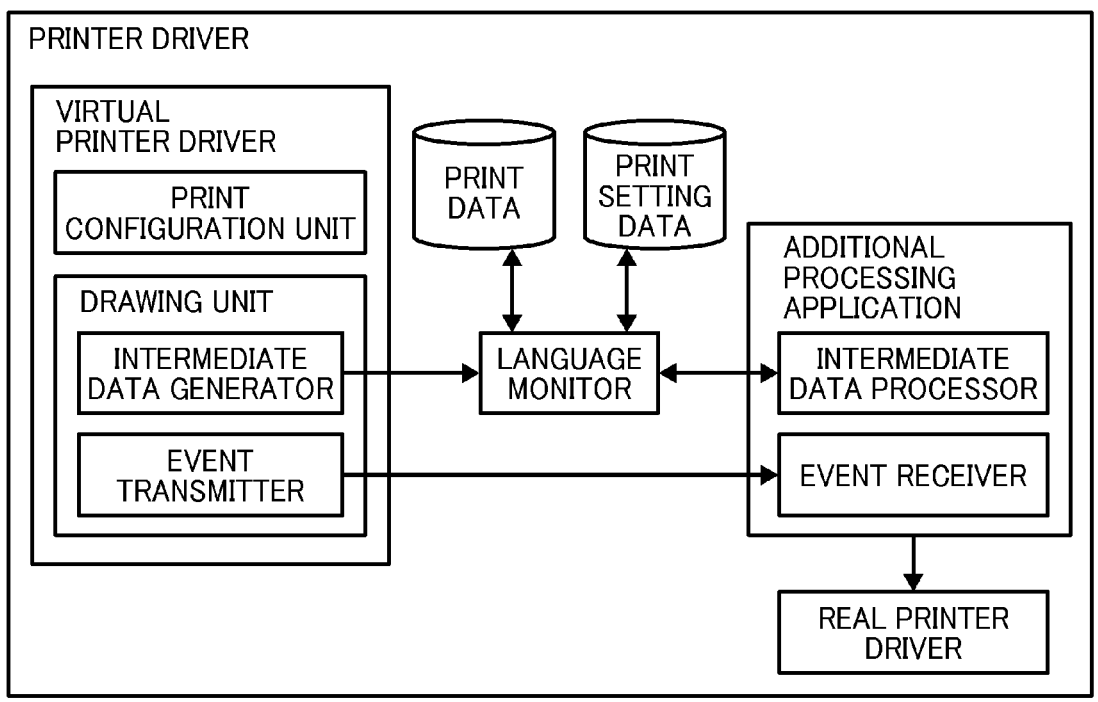
FIG. 5 is a block diagram illustrating functions of a printer driver as an embodiment of the present invention.

Here, a function included in the printer driver 210 and 110 is described below. FIG. 5 is a block diagram illustrating a whole function implemented by the printer driver 210 and 110 in this embodiment. As shown in FIG. 5, the printer driver in this embodiment includes a virtual printer driver, a language monitor, an additional processing application, and a real printer driver.

The virtual printer driver includes a print configuration unit and a drawing unit. The print configuration unit provides various GUIs for performing configuration to instruct the image processing apparatus 3 to execute printing and acquires print settings in response to user operation. The drawing unit includes an intermediate data generator that generates intermediate data prior to generating a print job based on information on a document and image to be printed as a target image for forming an outputting an image and an event transmitter that reports events such as starting printing and finishing printing to a subsequent module.

The intermediate data in this embodiment is information in universal data format supported by multiple software modules such as XPS and Portable Document Format (PDF), and images are laid out in the intermediate data for each page. Consequently, the subsequent module can be implemented by a module compatible with the universal data format, and that can improve versatility of the system.

The language monitor is a software module embedded in the OS and includes an interface to read/write data using a specific key and the communication function via the network. By calling an interface of the language monitor in case of generating the intermediate data, the intermediate data generator stores the generated intermediate data as print data in a predetermined storage area. In addition, the print configuration unit stores the acquired print settings in a predetermined storage area as print setting information.

The additional processing application is a software module to provide functions defined additionally in printing among the mechanism of the printer driver. As examples of the additional functions, a preview function using information converted to the intermediate data and an edit function of information converted to the intermediate data can be listed. The information edit function is to process data such as adding a watermark and a tint block in case of including specific strings such as "for internal use only" and "confidential" in the intermediate data and detecting them. Such additional function can be implemented by the intermediate data processor as a module that consists of the additional processing application. That is, the additional processing application functions as an additional processor.

By calling the interface provided by the language monitor, the intermediate data processor acquires the intermediate data stored in the predetermined storage area and implements the additional functions described above. To use the language monitor by the intermediate data processor is one of the key points in this embodiment. Since the language monitor is the mechanism embedded in the OS, the language monitor can exchange information within a process framework presumed by the OS.

In case of acquiring the intermediate data, since the additional processing application only needs to call the interface of the language monitor using a key as an identifier, it is not necessary to report the storing destination of the intermediate data generated by the intermediate data generator to the additional processing application, and that can simplify the process. In addition, since the process is performed within the framework presumed by the OS by using the language monitor, it is not necessary to display a pop up message to obtain user permission for the process in case of reading/writing information by the language monitor, and it is possible to perform a process by the additional processing application smoothly.

Furthermore, since the language monitor includes a communication function via the network, in case of performing printing using the image processing apparatus, even if information is exchanged between the PC 2 and the driver server 1 via the network, it is possible to realize the process by the language monitor without creating a software module compatible with a communication protocol for the information exchange.

In addition, the additional processing application includes an event receiver. The event receiver acquires the notification of an event by the event transmitter and recognizes that process has been transferred from the virtual printer driver.

The real printer driver is a narrowly-defined printer driver as described above and is a print job generator that generates a print job to instruct the image processing apparatus 3 to execute printing based on the intermediate data generated by the intermediate data generator and processed by the intermediate data processor. The real printer driver generates the print job using PDLs compatible with the image processing apparatus 3 such as Printer Control Language (PCL) 6, PostScript (PS), and Refined Printing Command Stream (RPCS). In that case, since the intermediate data consists of universal data format, it is possible to use a provided printer driver compatible with the image processing apparatus 3 as the real printer driver in order to realize the system in this embodiment.

As described above, the printer driver 210 in the PC 2 is constructed by copying the printer driver 110 in the driver server 1. Therefore, while the printer driver 110 in the driver server 1 includes all modules shown in FIG. 5, the printer driver 210 in the PC 2 can implemented only by the modules at least compatible with functions performed on the PC 2.

Figure 6:
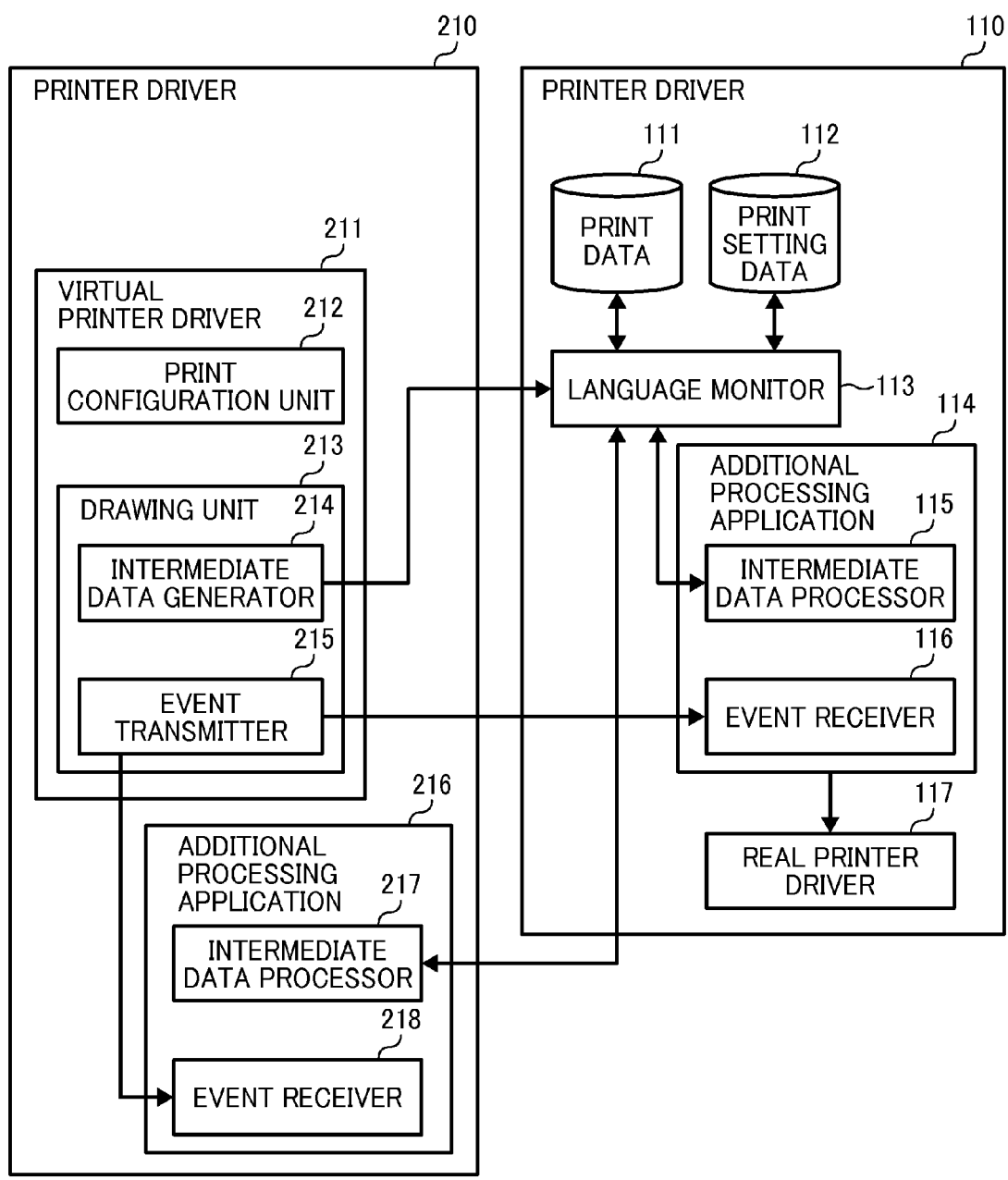
FIG. 6 is a block diagram illustrating a functional configuration of the printer driver in the PC and the driver server as an embodiment of the present invention.

Next, distribution of functions between the printer driver 210 in the PC 2 and the printer driver 110 in the driver server 1 in this embodiment is described with reference to FIG. 6. As shown in FIG. 6, in the printer driver 210 in the PC 2, functions that correspond to the virtual printer driver 211 and the additional processing application 216 are realized. In the printer driver 110 in the driver server 1, functions that correspond to a language monitor 113, an additional processing application 114, and a real printer driver 117 are realized. Print data 111 and print settings data 112 are stored in a storage area allocated in the driver server 1.

As shown in FIG. 5, the virtual printer driver 211 includes a print configuration unit 212 and a drawing unit 213. The drawing unit 213 includes an intermediate data generator 214 and an event transmitter 215. The additional processing application 216 in the printer driver 210 includes an intermediate data processor 217 and an event receiver 218. The additional processing application 114 in the printer driver 110 includes an intermediate data processor 115 and an event receiver 116.

As shown in FIG. 6, in the system of this embodiment, the additional processing application 216 is constructed in the printer driver 210, and the additional processing application 114 is constructed in the printer driver 110. This is because of realizing additional functions that should be realized in the PC 2 such as displaying a preview based on the intermediate data on the PC 2 and realizing additional functions that can be assigned to the driver server 1 such as editing the intermediate data on the driver server 1.

Figure 7:
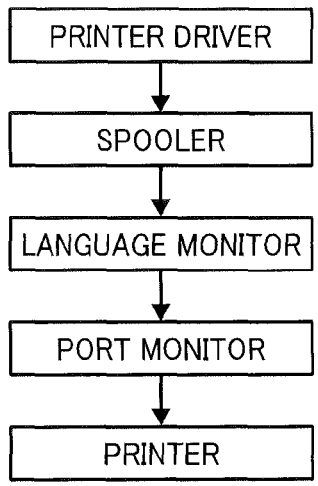
FIG. 7 is a diagram illustrating a process before and after language monitor as an embodiment of the present invention.

Here, a function of the language monitor 113 is described below. FIG. 7 is a diagram illustrating processing order of modules in the printing process. As shown in FIG. 7, the print data output by the printer driver is passed into a spooler as one of the functions of the OS. The language monitor 113 is a module invoked by the spooler, acquires the print data from the spooler, and stores the print data in a predetermined area in accordance with a specified key.

In normal printing, the print data stored by the language monitor is passed into a port monitor, and the port monitor transfers the print data to a printer such as the image processing apparatus 3 via a port driver. Consequently, printing by the printer is performed.

Figure 8:
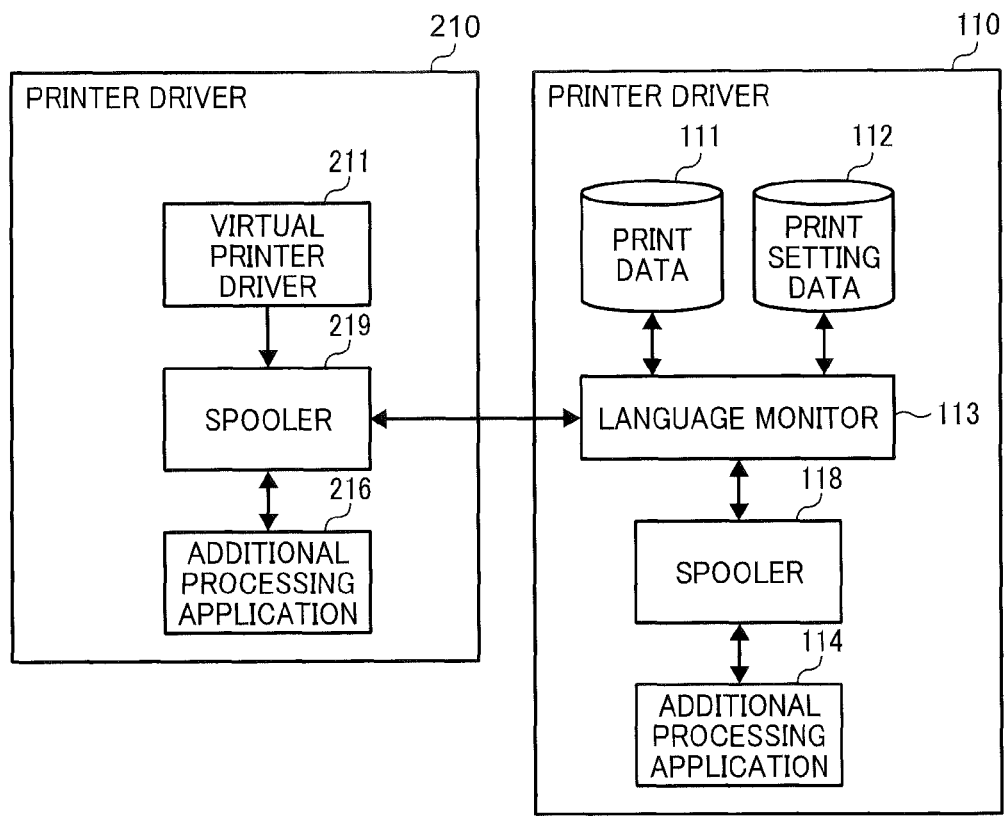
FIG. 8 is a block diagram illustrating usage of the language monitor via a spooler as an embodiment of the present invention.

FIG. 8 is a block diagram illustrating relationship between the language monitor 113 and spoolers of the printer driver 210 and the printer driver 110 in the system of this embodiment. As shown in FIG. 8, in case of generating the intermediate data by the virtual printer driver 211, a spooler 219 in the printer driver 210 calls the language monitor 113, and the intermediate data generated by the virtual printer driver 211 is stored in a storage area in the printer driver 110 via the language monitor 113. That is, the language monitor 113 is a software module that stores the intermediate data in the spool process.

In case of processing displaying a preview by the additional processing application 216 included in the printer driver 210, the additional processing application 216 calls language monitor 113 via the spooler 219, acquires the intermediate data stored in the printer driver 110, and performs the preview process. In case of processing editing data by the additional processing application 114 in the printer driver 110, the additional processing application 114 calls the language monitor 113 via the spooler 118, acquires the intermediate data stored in the printer driver 110, and performs the data editing process.

Figure 9:
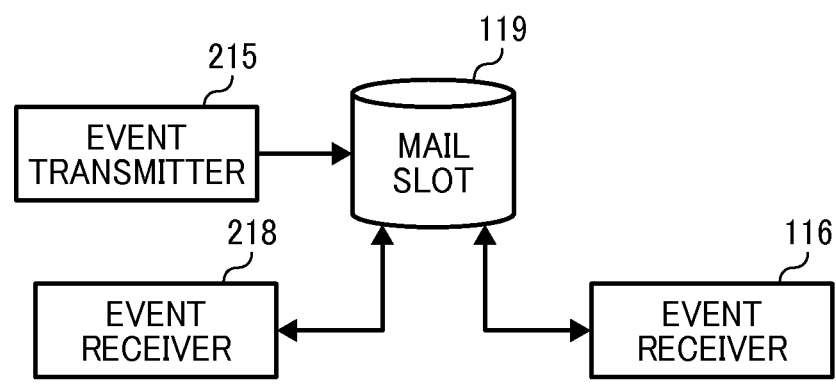
FIG. 9 is a diagram illustrating event transfer via a mail slot as an embodiment of the present invention.

Next, exchange of event information among the event transmitter 215, the event receiver 218, and the event receiver 116 is described below with reference to FIG. 9. A mail slot is used for exchanging the event information in this embodiment. In case of exchanging the event information in this embodiment, the event receiver 116 generates a mail slot by specifying a mail slot name.

The event transmitter 215 writes in the mail slot using the mail slot name specified by the event receiver 116. The event receiver 218 and the event receiver 116 monitors whether or not data is written in the mail slot. In case data is written in the mail slot, the data is read from the mail slot. Consequently, the event information is transferred from the event transmitter 215 to the event receivers 116 and 218. In this embodiment, since a module included in the printer driver 210 is copied from the printer driver 110, it is possible to specify the mail slot name in copying the module. However, it is also possible to change the used mail slot name depending on registry and external configuration.

Figure 10:
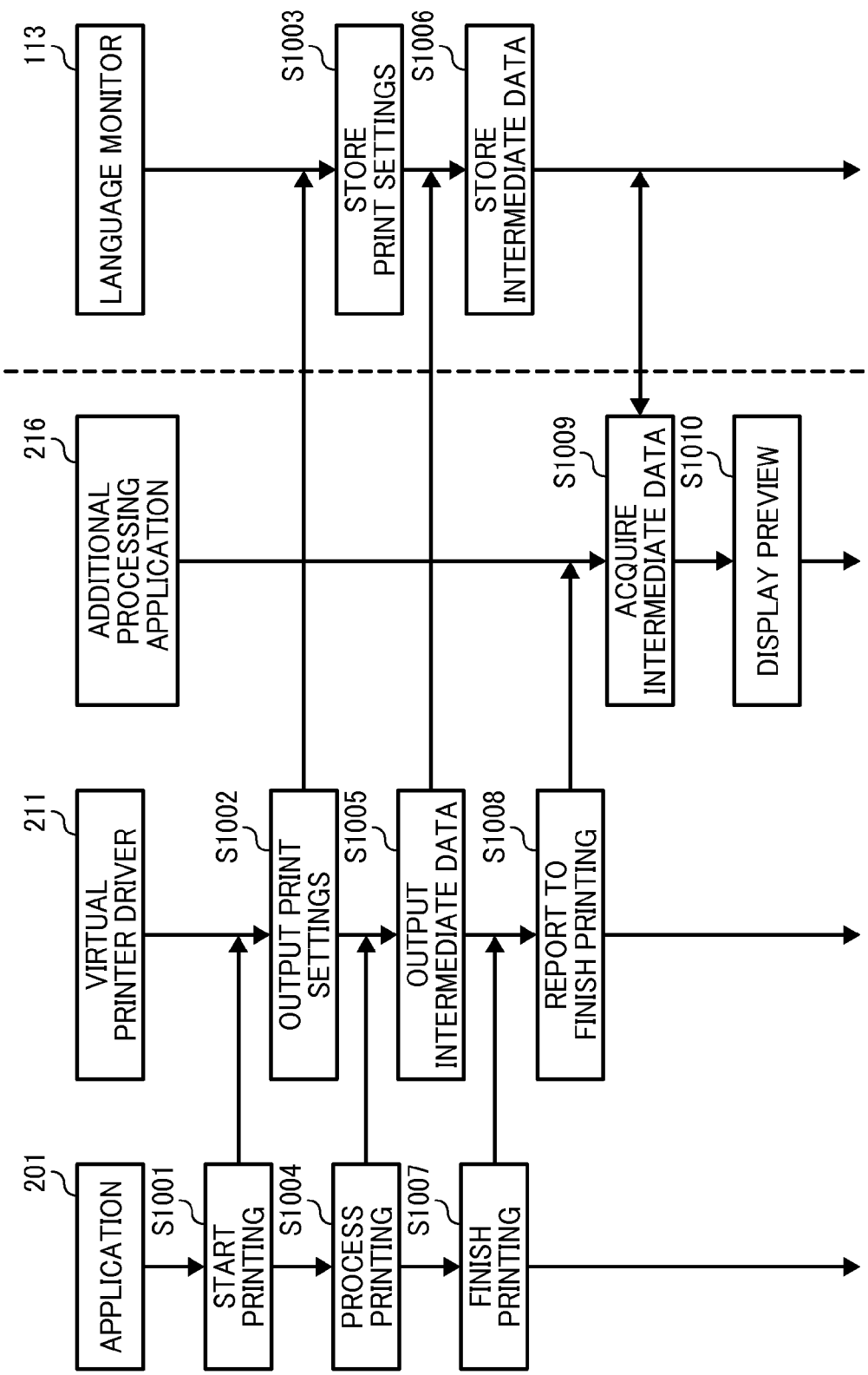
FIG. 10 is a sequence diagram illustrating a process of displaying a preview as an embodiment of the present invention.

FIG. 10 is a sequence diagram illustrating a process of displaying a preview in the system of this embodiment. As shown in FIG. 10, the application 201 starts a printing process in the PC 2 in S1001. The step in S1001 is executed by inputting print settings and instructing to start printing on the PC 2 by user operation.

After the operation by the application 201, the print configuration unit 212 in the virtual printer driver 211 acquires print settings and outputs the print settings to the language monitor 113 via the spooler 219 in S1002. That is, in S1002, the print configuration unit 212 in the virtual printer driver 211 functions as a configuration information storage processor. Subsequently, the language monitor 113 stores the print setting information in a predetermined storage area in the printer driver 110 in S1003.

Next, the application 201 passes image information to be printed into the virtual printer driver 211 in S1004. Subsequently, the intermediate data generator 214 in the virtual printer driver 211 generates the intermediate data and outputs the intermediate data to the language monitor 113 via the spooler 219 in S1005. After that, the language monitor 113 stores the intermediate data as print data in a predetermined storage area in the printer driver 110 in S1006. That is, the intermediate data generator 214 functions as an intermediate data storage processor.

After finishing outputting the image information to be printed, the application 201 finishes the printing process in S1007. Subsequently, the event transmitter 215 in the virtual printer driver 211 reports to finish the printing process using the mechanism shown in FIG. 9 in S1008. After the event transmitter 215 reports to finish the printing process, the event receiver 218 in the additional processing application 216 recognizes that the process has been passed from the virtual printer driver 211.

After the additional processing application 216 recognizes that the process has been passed from the virtual printer driver 211, the intermediate data processor 217 acquires the intermediate data from the language monitor 113 using the mechanism shown in FIG. 8 in S1009 and displays the preview based on the acquired intermediate data in S1010. In S1010, the additional processing application 216 displays the preview by displaying the GUI via the display unit such as the LCD 60 included in the PC 2. By performing the process described above, the operation of displaying the preview in this embodiment is accomplished.

Next, a printing process after displaying the preview and processing data is described below with reference to a sequence diagram shown in FIG. 11. The process shown in FIG. 11 starts by commanding to process data and execute printing on the GUI to display the preview performed on the PC 2 by the operation shown in FIG. 10.

Figure 11:
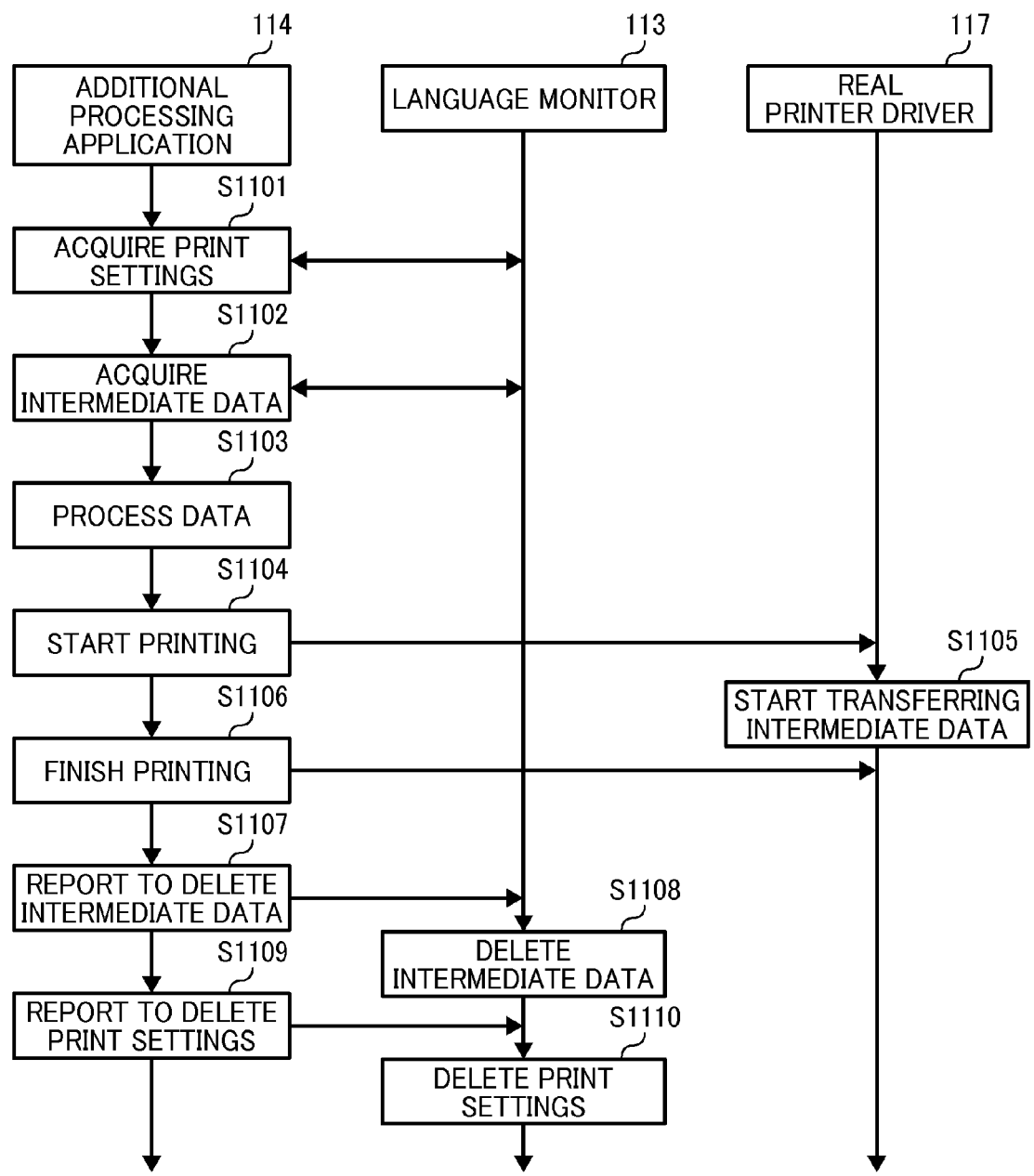
FIG. 11 is a sequence diagram illustrating a printing process after displaying the preview as an embodiment of the present invention.

As shown in FIG. 11, in the driver server 1, the intermediate data processor 115 in the additional processing application 114 calls the language monitor 113 and acquires the print settings and the intermediate data in S1101 and S1102. That is, the intermediate data processor 115 functions as an intermediate data acquisition unit. Subsequently, the intermediate data processor 115 performs processing data along with the command to process the data in S1103 and inputs the print settings and the processed intermediate data to the real printer driver 117 in S1104. That is, the additional processing application 114 functions as a print job generation controller in S1104. Depending on the additional functions of the additional processing application 114, the print settings can be edited in S1103.

After acquiring the print settings and the intermediate data from the additional processing application 114, the real printer driver starts a process of generating a print job input to the image processing apparatus 3 based on the intermediate data in accordance with the print settings just like a process executed by a general printer driver in S1105. Subsequently, print jobs are transferred to the image processing apparatus 3 sequentially, and the image processing apparatus 3 performs printing.

After inputting all the intermediate data to be printed to the real printer driver 117, the additional processing application 114 performs a process of finishing printing in S1106 and finishes the process executed by the real printer driver 117. Subsequently, the additional processing application 114 deletes the intermediate data in S1107 and S1108 and deletes the print settings in S1109 and S1110 by calling the language monitor 113. Subsequently, the intermediate data and the print settings after printing are deleted from the storage area in the printer driver 110, and the printing operation in the system of this embodiment is finally completed.

As described above, in the system of this embodiment, to realize the preview function based on the intermediate data and the data editing function, the additional processing application 216 and 114 acquires the intermediate data via the language monitor 113 as the mechanism embedded in the OS. Therefore, whether the intermediate data is stored in the PC 2 or the driver server 1, since it is needed only to acquire information handled by the language monitor 113, the additional processing application 216 and 114 can acquire the intermediate data easily.

Consequently, with the system of this embodiment, in distributing the part of the function to use the image forming apparatus via the information processing apparatus between the information processing apparatus and the other apparatus connected via the network, it is possible to realize the first process of generating versatile data and the second process of realizing the additional function based on the generated versatile data. Consequently, the module that realizes the additional function in the second process only needs to be compatible with the versatile data.

The print job to be input to the image processing apparatus 3 finally is generated based on the versatile data generated and edited as described above. Therefore, it is unnecessary to construct a new printer driver compatible with a specific data format, and the conventional printer driver compatible with the image processing apparatus 3 can be used as the real printer driver. Consequently, the system can be realized more easily.

Figure 12:
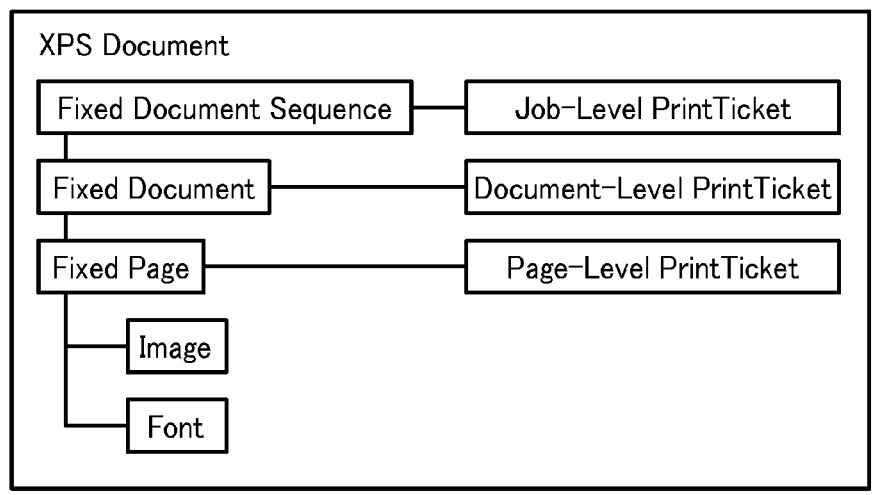
FIG. 12 is a diagram illustrating a XPS data structure as an embodiment of the present invention.

In this embodiment, XPS and PDF are taken as examples of the intermediate data in versatile data format. Here, structure of XPS data is described below with reference to FIG. 12. As shown in FIG. 12, the XPS data includes information such as Fixed Document Sequence, Fixed Document, Fixed Page, Image, and Font, and the XPS data consists of print tickets associated with the included information.

Figure 13:
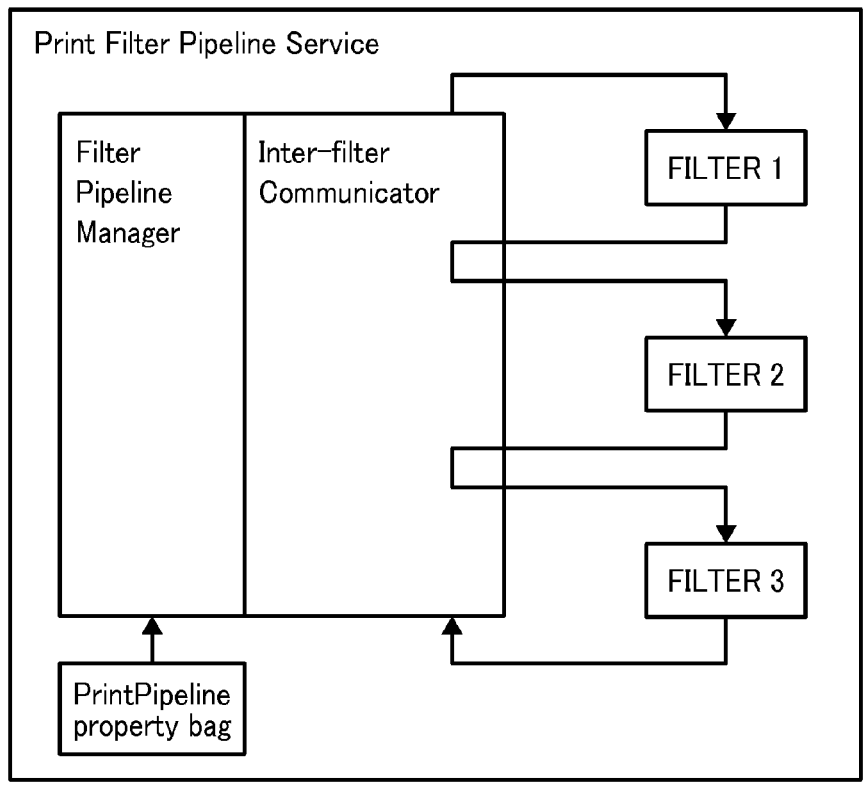
FIG. 13 is a diagram illustrating a drawing unit of a virtual printer driver as an embodiment of the present invention.

The structure of the XPS data described above relates to a generating process of the XPS data executed by the drawing unit 213 in the virtual printer driver 211 realized by the XPS driver. FIG. 13 is a diagram illustrating the drawing unit 213 of the virtual printer driver 211 using the XPS driver. The drawing unit of the XPS driver operates in a process of Print Filter Pipeline Service.

Among the modules shown in FIG. 13, a vendor who supplies the image processing apparatus 3 can develop filter units. These filter units function as the intermediate data generator 214 included in the drawing unit 213. Filter Pipeline Manager cooperates with Inter-filter Communicator and calls the filter. After finishing all filter processes, the XPS data processed by the filter is transferred to the spooler 219. Drawing information necessary for filters can be configured and acquired by using PrintPipeline Property Bag.

There are two prominent types of the XPS filters, XtoXFilter and StoSFilter. The XtoXFilter can handle each part of the XPS file. Here, the part means each information that consists of the XPS data shown in FIG. 11. On the other hand, the StoSFilter can handle the XPS file as stream.

The virtual printer driver 211 includes the function of outputting the print data and the print setting information separately as shown in FIG. 10, and this function is realized by implementing the filters that include each function.

Figure 14A:
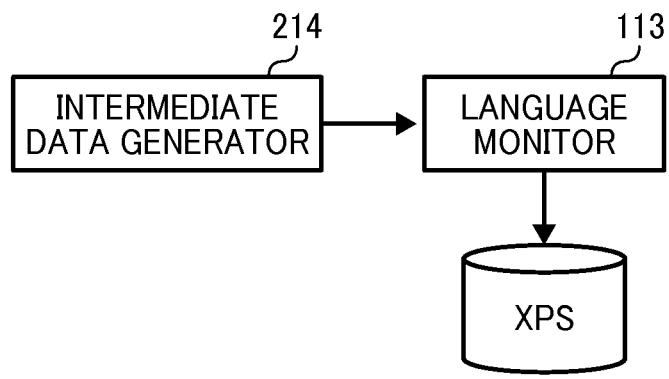
FIGS. 14A and 14B are diagrams illustrating output of intermediate data by an intermediate data generator as an embodiment of the present invention.
Figure 14B:
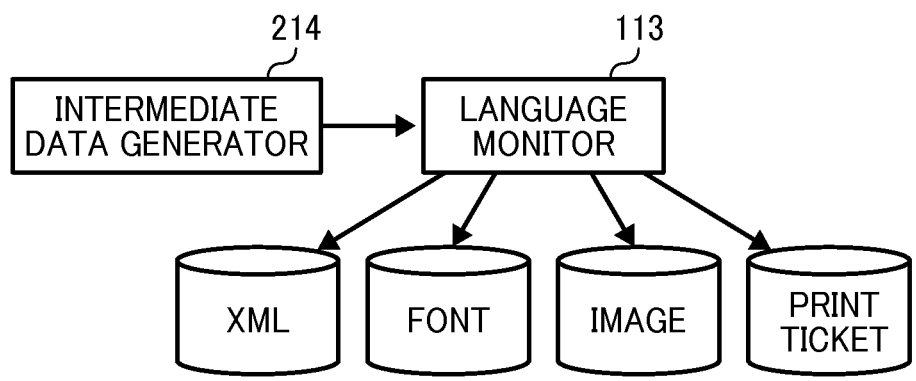

FIG. 14A is a diagram illustrating output of the XPS data from the intermediate data generator 214 via the language monitor 113 in case of the StoSFilter, and FIG. 14B is a diagram illustrating output of the XPS data from the intermediate data generator 214 via the language monitor 113 in case of the XtoXFilter. In FIG. 14A, the filter that consists of the drawing unit 213 is consisted by using the StoSFilter. As described above, since the StoSFilter handles the XPS file as stream, data is output as the XPS data in a lump sum. In this case, as shown in FIG. 12, since the XPS data includes the print tickets, it is unnecessary to output the print tickets separately.

In FIG. 14B, the filter that consists of the drawing unit 213 is consisted by using the XtoXFilter. As described above, the XtoXFilter can handle each part of the XPS file. Therefore, as shown in FIG. 14B, the intermediate data generator 214 outputs Extensible Markup Language (XML) data for each page that consists of the XPS data, and Font and Image data related to the XML data.

In the case shown in FIG. 14B, different from the case shown in FIG. 14A, the additional processing application 216 and 114 can access the intermediate data for each page before the whole XPS data is output. In the case shown in FIG. 14B, since data for each part that consists of the XPS data is output, the print tickets are also output. Consequently, the additional processing application 216 and 114 can refer to the print settings.

In the embodiment described above, as shown in FIG. 6, the case in which the print data and the print setting information are stored in the driver server 1 is described. This case is just an example, and the configuration in which the print data and the print setting information are stored in the PC 2 is also possible. However, in general Point&Print, the language monitor 113 is not copied to the PC 2. Therefore, in case of calling the language monitor 113 via the spooler 219 in the printer driver 210 of the PC 2, it is general to call the language monitor 113 in the driver server 1.

Consequently, in case of storing the intermediate data in the PC 2, the intermediate data once transferred to the driver server 1 to pass to the language monitor 113 is transferred again to the PC 2 by the language monitor 113 and stored, and that makes the process inefficient. Contrarily, as shown in FIG. 6, in case of storing the print data and the print setting information in the driver server 1, the language monitor 113 is constructed in the driver server 1, and that can realize an efficient process.

The present invention may be implemented as a method, performed by a control system for forming and outputting an image. The method of controlling the system comprising the steps of acquiring an image to be output and generate intermediate data as print data in format supported by multiple software modules, storing the generated intermediate data in a predetermined storage area by a spooling process of the print data, acquiring the intermediate data via a software module that stores the intermediate data during spooling of the print data, executing an additional process in outputting the image based on the acquired intermediate data, generating a print job to instruct the image forming apparatus to execute forming and outputting the image, and instructing to generate the print job based on the intermediate data.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. A system, comprising:
a first processor; and
a second processor,
wherein the first processor functions as:
a storage controller to accept a request to store data regarding printing, store the data regarding printing requested to be stored in a predetermined storage area, and transfer the data regarding printing based on a request to acquire the data regarding printing; and
a converter to acquire the data regarding printing stored in the predetermined storage area by requesting the storage controller to transfer the data regarding printing in case of receiving notification of starting printing and convert the acquired data regarding printing into print data processable by an image processing apparatus, and
wherein the second processor functions as:
a print request acceptor to accept a request for printing;
a data generator to generate the data regarding printing processable by a plurality of methods based on the request for printing accepted by the print request acceptor;
a data storage requestor to request the storage controller to store the data regarding printing generated by the data generator; and
an additional processing unit to acquire the data regarding printing stored in the predetermined area by requesting the storage controller to transfer the data regarding printing, process the acquired data regarding printing, and notify the converter about the notification of starting printing.

2. The system according to claim 1, wherein the second processor further functions as a configuration information storage processor to store setting information related to forming and outputting an image generated in accordance with the data regarding printing in the predetermined storage area by spooling the data regarding printing,
and wherein the converter acquires the data regarding printing and the setting information via the storage controller for storing the data regarding printing, and generates a print job based on the data regarding printing in accordance with the setting information.

3. The system according to claim 1, wherein the converter instructs the storage controller for storing the data regarding printing to store the data regarding printing in the predetermined storage area by specifying a predetermined identifier, and the acquires the data regarding printing from the storage controller specifying the predetermined identifier.

4. The system according to claim 1, wherein the additional processing unit displays an image to be output on a display unit of the second processor based on the acquired data regarding printing.

5. The system according to claim 1, wherein the additional processing unit adds predetermined information to the data regarding printing based on the acquired data regarding printing when the predetermined information is detected in an image to be output.

6. An image output control apparatus, comprising:
a first processor; and
a second processor,
wherein the first processor functions as:
a storage controller to accept a request to store data regarding printing, store the data regarding printing requested to be stored in a predetermined storage area, and transfer the data regarding printing based on a request to acquire the data regarding printing; and a converter to acquire the data regarding printing stored in the predetermined storage area by requesting the storage controller to transfer the data regarding printing in case of receiving notification of starting printing and convert the acquired data regarding printing into print data processable by an image processing apparatus, and wherein the second processor functions as:
- a print request acceptor to accept a request for printing;
- a data generator to generate the data regarding printing processable by a plurality of methods based on the request for printing accepted by the print request acceptor;
- a data storage requestor to request the storage controller to store the data regarding printing generated by the data generator; and
- an additional processing unit to acquire the data regarding printing stored in the predetermined area by requesting the storage controller to transfer the data regarding printing, process the acquired data regarding printing, and notify the converter about the notification of starting printing.

7. The image output control apparatus according to claim 6, wherein the second processor further functions as a configuration information storage processor to store setting information related to forming and outputting an image generated in accordance with the data regarding printing in the predetermined storage area by spooling of the data regarding printing, and wherein the converter acquires the data regarding printing and the setting information via the storage controller that stores the data regarding printing, and generates a print job based on the data regarding printing in accordance with the setting information.

8. The image output control apparatus according to claim 6, wherein the second processor further functions to instruct the storage controller to store the data regarding printing in a predetermined storage area by specifying a predetermined identifier, and the converter acquires the data regarding printing from the storage controller specifying the predetermined identifier.

9. The image output control apparatus according to claim 6, wherein the converter displays the image to be output on a display unit of the second processor based on the acquired data regarding printing.

10. The image output control apparatus according to claim 6, wherein the additional processor adds predetermined information to the data regarding printing based on the acquired data regarding printing in case of detecting the predetermined information in an image to be output.

11. A non-transitory recording medium storing a program that, when executed by a computer, causes a processor to implement a method of controlling a system for forming and outputting an image, in which an image output control apparatus on which a program to use an image forming apparatus from an information processing apparatus is installed cooperates with another information processing apparatus on which a program to use the image forming apparatus is installed and instructs the image forming apparatus to form and output the image, the method comprising:
- accepting a request to store data regarding printing, storing the data regarding printing requested to be stored in a predetermined storage area, and transferring the data regarding printing based on a request to acquire the data regarding printing;
- acquiring the data regarding printing stored in the predetermined storage area by requesting transfer of the data regarding printing in case of receiving notification of starting printing and converting the acquired data regarding printing into print data processable by an image processing apparatus;
- accepting a request for printing;
- generating the data regarding printing processable by a plurality of methods based on the accepted request for printing;
- requesting to store the data regarding printing; and
- acquiring the data regarding printing stored in the predetermined area by requesting transfer of the data regarding printing, processing the acquired data regarding printing, and providing notification of starting printing.

* * * * *